United States Patent
Kataoka et al.

(10) Patent No.: US 10,591,670 B2
(45) Date of Patent: Mar. 17, 2020

(54) OPTICAL WAVEGUIDE ELEMENT

(71) Applicant: SUMITOMO OSAKA CEMENT CO., LTD., Tokyo (JP)

(72) Inventors: Yu Kataoka, Tokyo (JP); Norikazu Miyazaki, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 16/360,031

(22) Filed: Mar. 21, 2019

(65) Prior Publication Data

US 2019/0293865 A1 Sep. 26, 2019

(30) Foreign Application Priority Data

Mar. 23, 2018 (JP) ................................. 2018-055613

(51) Int. Cl.
| | |
|---|---|
| *G02B 6/122* | (2006.01) |
| *G02B 6/293* | (2006.01) |
| *G02B 6/12* | (2006.01) |
| *G02F 1/01* | (2006.01) |
| *G02F 1/21* | (2006.01) |

(52) U.S. Cl.
CPC ......... *G02B 6/122* (2013.01); *G02B 6/29352* (2013.01); *G02F 1/011* (2013.01); *G02B 2006/1204* (2013.01); *G02B 2006/12083* (2013.01); *G02F 2001/212* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,444,039 | B2 * | 10/2008 | Kondou ................. | G02F 1/035 385/2 |
| 8,831,385 | B2 * | 9/2014 | Sugiyama ............. | G02F 1/0356 385/1 |
| 8,909,006 | B2 * | 12/2014 | Miyazaki ............... | G02B 6/125 359/618 |
| 9,081,214 | B2 * | 7/2015 | Oikawa ................. | G02F 1/035 |
| 9,377,666 | B2 * | 6/2016 | Miyazaki ............... | G02F 1/225 |
| 2006/0110089 | A1 * | 5/2006 | Ichikawa .............. | G02F 1/0311 385/3 |
| 2019/0293865 | A1 * | 9/2019 | Kataoka ............. | G02B 6/29352 |

FOREIGN PATENT DOCUMENTS

JP      2015096886      5/2015

* cited by examiner

*Primary Examiner* — Rhonda S Peace
(74) *Attorney, Agent, or Firm* — JCIPRNET (57) ABSTRACT

In an optical waveguide element, an optical waveguide is formed on a substrate, the optical waveguide has a main waveguide that propagates signal light, a waveguide for unnecessary light that guides unnecessary light released from the main waveguide, and a waveguide for collecting unnecessary light to which the unnecessary light emitted from the waveguide for unnecessary light is introduced, the waveguide for unnecessary light is connected to the waveguide for collecting unnecessary light via a waveguide for connection, and a width of the waveguide for connection, which is a width in a direction that perpendicularly intersects a propagation direction of the unnecessary light, at a portion connected to the waveguide for collecting unnecessary light is set to be wider than a width at a portion connected to the waveguide for unnecessary light with the waveguide for connection.

4 Claims, 5 Drawing Sheets

OPTICAL WAVEGUIDE ELEMENT

CROSS-REFERENCE TO RELATED APPLICATION

This application claims the priority benefit of Japan application no. 2018-055613, filed on Mar. 23, 2018. The entirety of each of the above-mentioned patent applications is hereby incorporated by reference herein and made a part of this specification.

BACKGROUND

Technical Field

The present disclosure relates to an optical waveguide element with an optical waveguide formed on a substrate.

Description of Related Art

Optical waveguide elements provided with optical functions, such as optical modulators, have been used in many cases in the field of optical communication and the field of optical measurement. Some optical waveguide elements include optical waveguides which have higher refractive indexes than those of substrate materials due to different materials being added to substrate made of quartz, lithium niobate, semiconductors, polymer materials, or the like, or are formed as ridge-shaped protrusions on the substrate.

According to such an optical waveguide element using the substrate, unnecessary light released from a part of an optical waveguide is coupled to other parts of the optical waveguide, and this may degrade optical properties in a case in which a plurality of optical waveguides are formed in the same substrate or in a case in which multiple branching sections and merging sections are formed in the optical waveguide in the same substrate. Also, this may lead to deterioration of optical properties such as an ON/OFF extinction ratio in a Mach-Zehnder-type optical modulator.

Thus, a waveguide for unnecessary light that guides unnecessary light is provided on the substrate separately from a main waveguide that propagates signal light to curb recombining of the unnecessary light in the main waveguide. In addition, there is also a case in which a light absorbing mechanism is disposed at a part of the waveguide for unnecessary light in order to absorb and eliminate the unnecessary light that is guided by the waveguide for unnecessary light. Further, Patent Document 1 (Japanese Patent Laid-Open No. 2015-96886) also discloses a configuration in which a waveguide for collecting unnecessary light is formed in a direction that is substantially the same as a direction in which signal light propagated in a main waveguide is mainly propagated, between the main waveguide and a side end of the substrate and the unnecessary light emitted from the waveguide for unnecessary light is collected by the waveguide for collecting unnecessary light.

Figure 1:
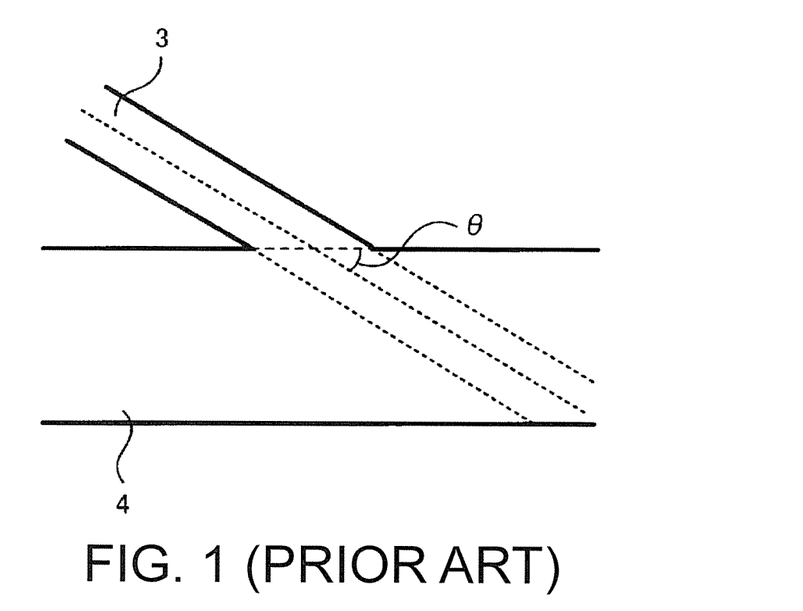
FIG. 1 is a diagram illustrating an example of a structure of an optical waveguide element according to an example in the related art.

FIG. 1 illustrates an example of a structure of an optical waveguide element according to an example in the related art. In FIG. 1, a waveguide for unnecessary light 3 is obliquely connected directly to a waveguide for collecting unnecessary light 4. The waveguide for unnecessary light 3 is basically configured to have a width that is equal to or greater than a width of a single-mode waveguide. The waveguide for collecting unnecessary light 4 is configured to have a width that is equal to or greater than three times the width of the single-mode waveguide to form a multi-mode waveguide.

Figure 4A:
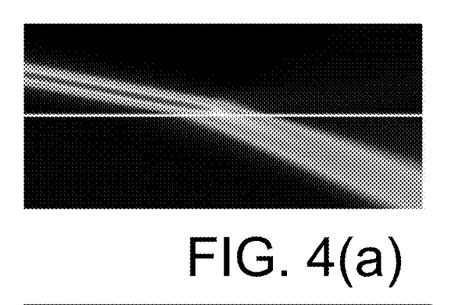
FIG. 4(a) to FIG. 4(c) are diagrams illustrating a state in which unnecessary light introduced to a waveguide for collecting unnecessary light is refracted.

Unnecessary light that has been propagated through the waveguide for unnecessary light 3 starts to be coupled to the waveguide for collecting unnecessary light 4 when the unnecessary light approaches the waveguide for collecting unnecessary light 4. Then, the unnecessary light introduced from the waveguide for unnecessary light to the waveguide for collecting unnecessary light is refracted in a direction away from an extending direction of the waveguide for collecting unnecessary light with an increase in coupling to the waveguide for collecting unnecessary light as illustrated in FIG. 4(a). That is, an entry angle $\theta$ of the unnecessary light emitted from the waveguide for unnecessary light relative to the waveguide for collecting unnecessary light (an angle relative to the extending direction of the waveguide for collecting unnecessary light) increases.

Figure 5A:
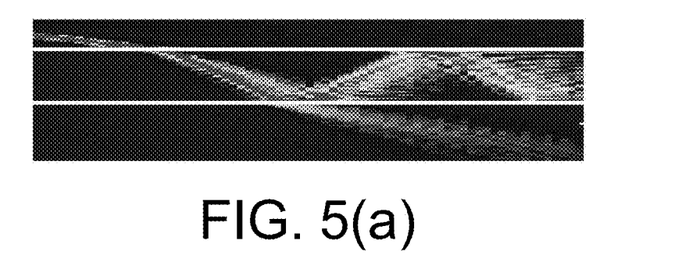
FIG. 5(a) to FIG. 5(b) are diagram illustrating a state in which unnecessary light introduced to the waveguide for collecting unnecessary light is propagated.

As a result, a part of the unnecessary light does not satisfy all reflection conditions at a boundary of the waveguide for collecting unnecessary light on a side opposite to the side on which the waveguide for unnecessary light is connected. Thus, there is a case in which a part of the unnecessary light is not trapped in the waveguide for collecting unnecessary light and leaks through the substrate as illustrated in FIG. 5(a), and this may degrade optical properties of the optical waveguide element. Patent Document 1 employs a countermeasure against this leakage of unnecessary light through the substrate by contriving a shape for the waveguide for collecting unnecessary light. However, according to the method, the width of the waveguide for collecting unnecessary light gradually increases with the connection of a plurality of waveguides for unnecessary light to the waveguide for collecting unnecessary light. Also, it is necessary to widen the width of the element in order to widen the interval between the main waveguides, and further, the length of the waveguides increases due to a bent waveguide connected to the main waveguides with a widened interval therebetween. Therefore, since this may prevent an increase in a degree of integration of the element and size reduction, further improvement is required.

An embodiment of the disclosure provides a small-sized optical waveguide element that curbs refraction when unnecessary light emitted from a waveguide for unnecessary light is introduced to a waveguide for collecting unnecessary light and prevents deterioration of optical properties and the like.

In order to solve the aforementioned problems, an optical waveguide element according to the disclosure has the following technical features.

SUMMARY (1) According to an embodiment, there is provided an optical waveguide element in which an optical waveguide is formed on a substrate, the optical waveguide has a main waveguide that propagates signal light, a waveguide for unnecessary light that guides unnecessary light released from the main waveguide, and a waveguide for collecting unnecessary light to which the unnecessary light emitted from the waveguide for unnecessary light is introduced, the waveguide for unnecessary light is connected to the waveguide for collecting unnecessary light via a waveguide for connection, and a width of the waveguide for connection, which is a width in a direction that perpendicularly intersects a propagation direction of the unnecessary light, at a portion connected to the waveguide for collecting unnecessary light is set to be wider than a width at a portion of the waveguide for unnecessary light connected to the waveguide for connection.

DESCRIPTION OF THE EMBODIMENTS

Figure 3A:
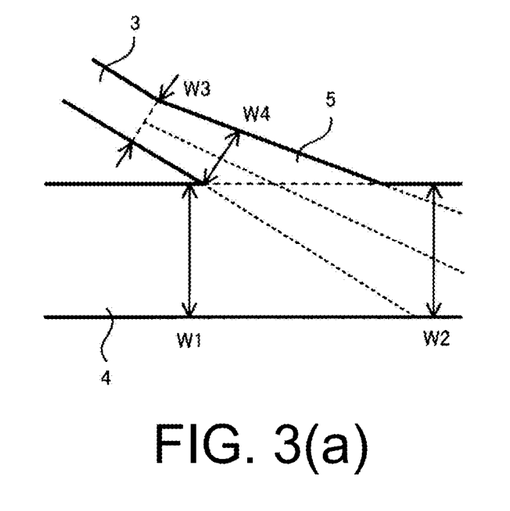
FIG. 3(a) to FIG. 3(d) are diagrams illustrating examples of a structure of an optical waveguide element according to an embodiment of the disclosure.

An optical waveguide element according to the disclosure will be described in detail with reference to the examples. Note that the disclosure is not limited by the examples described below. An optical waveguide element according to the disclosure is characterized in that an optical waveguide is formed on a substrate 1, the optical waveguide has a main waveguide 2 that propagates signal light, a waveguide for unnecessary light 3 that guides unnecessary light released from the main waveguide, and a waveguide for collecting unnecessary light 4 to which the unnecessary light emitted from the waveguide for unnecessary light is introduced, the waveguide for unnecessary light is connected to the waveguide for collecting unnecessary light via a waveguide for connection 5, and a width W4 of the waveguide for connection, which is a width in a direction that perpendicularly intersects a propagation direction of the unnecessary light, at a portion connected to the waveguide for collecting unnecessary light is set to be wider than a width W3 of the waveguide for unnecessary light at a portion connected to the waveguide for connection, as illustrated in FIG. 3(a) and the like.

A material of the substrate 1 is not particularly limited as long as it is possible to form a waveguide on the substrate, and is for example, quartz, lithium niobate, or a semiconductor material. In a case in which light waves that propagate through the optical waveguide are modulated with an electric field formed by an electrode of an optical modulator or the like, a substrate with an electro-optic effect may be used, such as lithium niobate or lithium tantalate. Also, in a case in which a thin substrate with a thickness of equal to or less than 30 μm is used, the substrate itself behaves as a slab waveguide, and unnecessary light thus tends to remain in the vicinity of the main waveguide, optical properties tend to deteriorate, and it is thus possible to more effectively apply the disclosure.

Figure 6A:
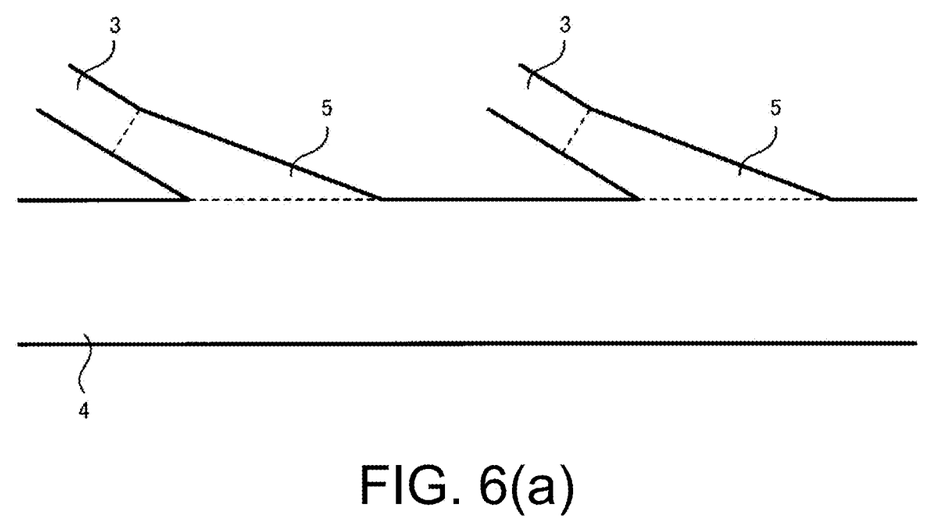
FIG. 6(a) to FIG. 6(b) are diagrams illustrating examples of a configuration in which a plurality of waveguides for unnecessary light is connected to the waveguide for collecting unnecessary light.
Figure 6B:
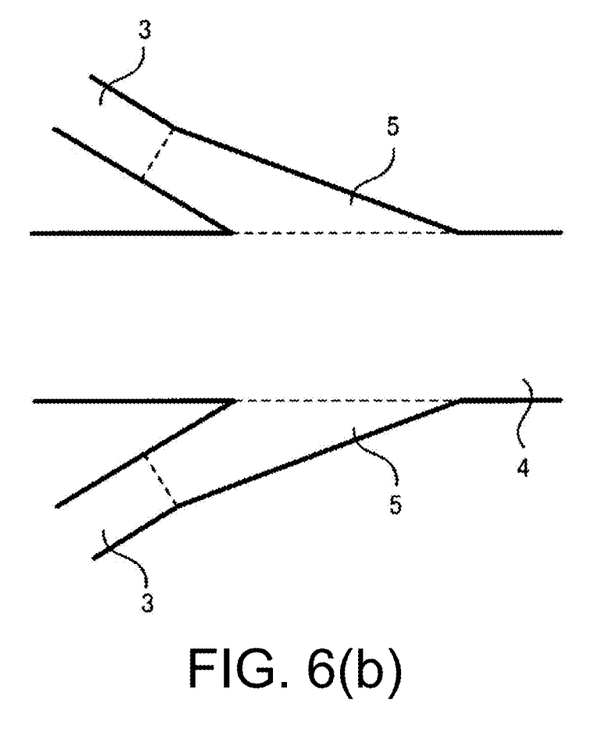
Figure 7:
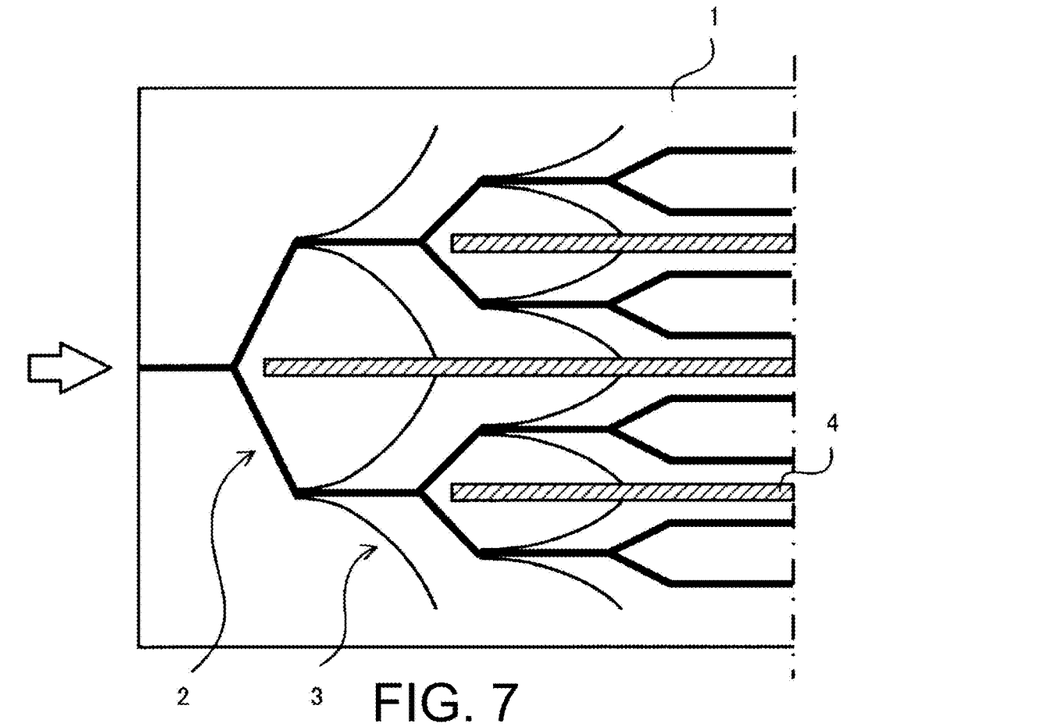
FIG. 7 is a diagram illustrating an example of a disposition of a waveguide for collecting unnecessary light.

As a method of forming the optical waveguide, a method of thermally diffusing a metal such as Ti into the substrate and forming a portion with a higher refractive index than that of the substrate material, a method of forming irregularities on the surface of the substrate to configure a ridge-type waveguide, or the like can be applied. As the main waveguide 2, as illustrated in FIGS. 6(a), 6(b) and 7, a Mach-Zehnder-type waveguide, a nest-type waveguide in which a Mach-Zehnder-type waveguide is combined in a nested form, or the like can be used. In particular, it is possible to effectively apply the disclosure to an optical modulator that includes an optical waveguide element with a nest-type waveguide since unnecessary light is generated at a merging section with a modulation operation and affects a merging section in a later stage in principle.

For the waveguide for unnecessary light 3, a known waveguide mechanism for unnecessary light can be employed (see Japanese Patent No, 5071542 and Japanese Patent Laid-Open Nos. 2011-164388 and 2004-46021, for example). For example, it is possible to dispose the waveguide for unnecessary light in contact with or away from the merging section in order to guide radiation mode light emitted from the merging section. In addition, it is also possible to dispose the waveguide for unnecessary light in the main waveguide before a branching section in order to remove higher-order mode light before guiding the light to the branching section. Further, it is also possible to provide a waveguide for unnecessary light that collects leaking light that leaks from the main waveguide and propagates in the substrate.

Figure 2:
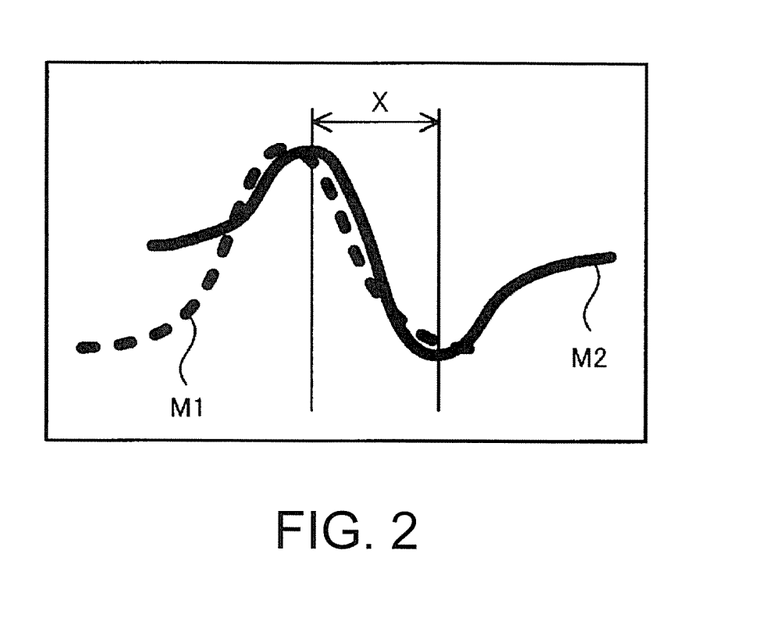
FIG. 2 is a diagram illustrating an example of waveform patterns of single-mode light and higher-order mode light.

In addition, it is also possible to employ a configuration as disclosed in FIG. 2 in Patent Document 1 for the waveguide for unnecessary light 3. That is, it is possible not only to form the waveguide for unnecessary light as one continuous optical waveguide but also to configure the waveguide for unnecessary light by dividing it such that the waveguide extends across another optical waveguide such as a main waveguide. In addition, it is also possible to configure the waveguide for unnecessary light by merging a plurality of waveguides, and merged unnecessary light can be extracted by a single waveguide for unnecessary light, for example.

Figure 8:
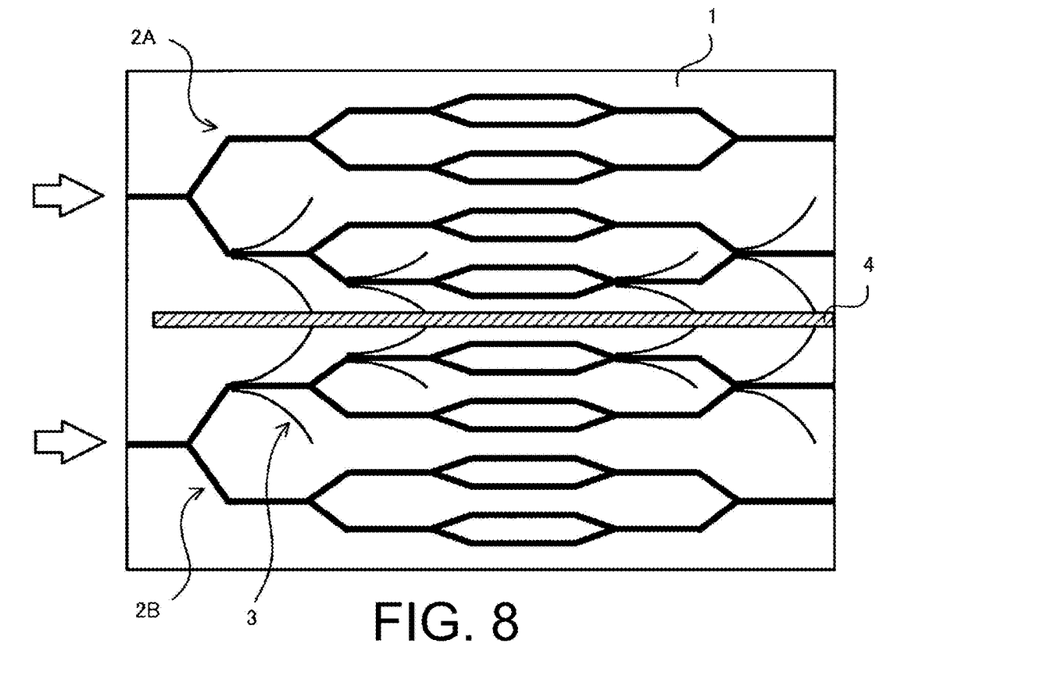
FIG. 8 is a diagram illustrating another example of a disposition of the waveguide for collecting unnecessary light.

As illustrated in FIGS. 7 and 8, the waveguide for collecting unnecessary light 4 is formed in a direction that is substantially the same as a direction in which the signal light propagating through the main waveguide 2 mainly propagates. In addition, the waveguide for collecting unnecessary light 4 has substantially equal widths (W1≈W2) before and after the portion at which the waveguide for collecting unnecessary light 4 is connected to the waveguide for connection 5. Note that the disposition and the number of the waveguides for collecting unnecessary light 4 are arbitrarily set, and the waveguides for collecting unnecessary light 4 may be formed such that the unnecessary light emitted from the waveguide for unnecessary light 3 can be efficiently collected.

The waveguide for unnecessary light 3 basically has a width that is equal to or greater than the width of a single-mode waveguide. The waveguide for collecting unnecessary light 4 has, for example, a width that is equal to or greater than three times the width of a single-mode waveguide, or has a width that is equal to or greater than five times the width of a single-mode waveguide. In this manner, it is possible to stably guide unnecessary light in a variety of modes including single mode light and higher-order mode light.

As main features of the optical waveguide element according to the disclosure, the waveguide for unnecessary light 3 is connected to the waveguide for collecting unnecessary light 4 via the waveguide for connection 5, and the width W4 of the waveguide for connection 5 at the portion connected to the waveguide for collecting unnecessary light 4 is set to be wider than the width W3 of the waveguide for unnecessary light 3 at the portion connected to the waveguide for connection 5. Here, the width of the waveguide means the width of the waveguide in a direction that perpendicularly intersects the propagation direction of the unnecessary light.

According to such a structure, since the beam center at the portion connected to the waveguide for collecting unnecessary light is further away from the waveguide for collecting unnecessary light as compared with a case of connection thereto without the waveguide for connection being interposed therebetween, due to the unnecessary light that has propagated through the waveguide for unnecessary light passing through the waveguide for connection, it is possible to curb refraction when the unnecessary light is introduced to the waveguide for collecting unnecessary light. That is, it is possible to reduce the entry angle θ of the unnecessary light that has propagated through the waveguide for unnecessary light relative to the waveguide for collecting unnecessary light. In this manner, leakage of a part of the unnecessary light from the waveguide for collecting unnecessary light and coupling to the other part of the optical waveguide are curbed. Therefore, it is possible to effectively prevent deterioration of optical properties and the like due to the unnecessary light.

Further, since it is not necessary to employ a countermeasure against leakage of the unnecessary light by contriving a shape for the waveguide for collecting unnecessary light, it is possible to use an optical waveguide with a substantially constant width as the waveguide for collecting unnecessary light. Therefore, it is possible to shorten the width of the optical waveguide element, and a degree of freedom in design is also enhanced.

FIG. 3(a) to FIG. 3(d) illustrate some examples of the structure of the optical waveguide element according to the disclosure. Hereinafter, the boundary on the side that is further from the waveguide for collecting unnecessary light 4 will be referred to as an "outer boundary", and the boundary on the side that is closer to the waveguide for collecting unnecessary light 4 will be referred to as an "inner boundary" among the boundaries that define the waveguide for connection in a sectional view of the substrate.

Figure 3B:
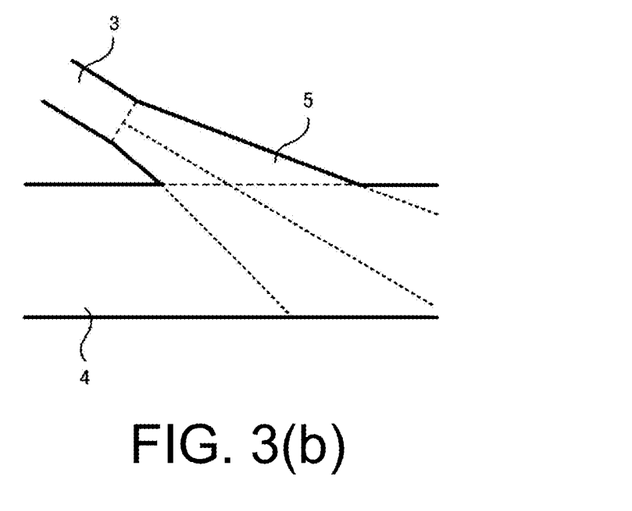

The waveguide for connection 5 illustrated in FIGS. 3(a) and 3(b) is formed to have a width that is the same as the width (W3) of the waveguide for unnecessary light 3 at the portion connected to the waveguide for unnecessary light 3 and that gradually increases toward the waveguide for collecting unnecessary light 4. Note that FIG. 3(a) illustrates an example in which only the outer boundary of the waveguide for connection 5 gradually extends in the outward direction, and FIG. 3(b) illustrates an example in which the inner boundary of the waveguide for connection 5 also gradually extends in the outward direction.

Figure 3C:
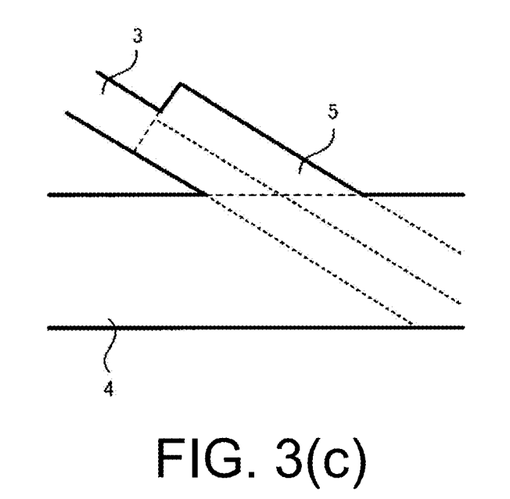
Figure 3D:
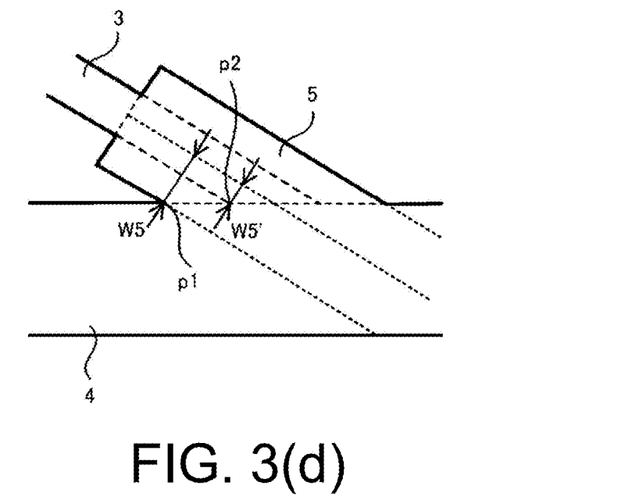

The waveguide for connection 5 illustrated in FIGS. 3(c) and 3(d) is formed to have a fixed width that is wider than the width of the waveguide for unnecessary light 3. Note that FIG. 3(c) illustrates an example in which only the outer boundary of the waveguide for connection 5 extends in the outer direction by a specific amount, and FIG. 3(d) illustrates an example in which the inner boundary of the waveguide for connection 5 also gradually extends in the outer direction by a specific amount.

Since the waveguide for connection 5 has a shape that is wider than the shape formed with the extension of the waveguide for unnecessary light 3 in all the configurations illustrated in FIGS. 3(a) to 3(d), it is possible to curb refraction of the unnecessary light at the portion connected to the waveguide for collecting unnecessary light 4. Note that these shapes are merely examples, a shape that extends in a stepwise manner by a predetermined width may also be employed, and any shape that extends such that the beam center at the portion connected to the waveguide for collecting unnecessary light is further away from the waveguide for collecting unnecessary light as compared with the shape formed with the extension of the waveguide for unnecessary light may be employed. That is, it is only necessary that the distance W5 (=W4/2) from the connection point p1 between the inner boundary of the waveguide for connection 5 and the waveguide for collecting unnecessary light 4 to the beam center (center line) of the waveguide for connection 5 be longer than the distance W5' from the connection point p2 between the boundary of the shape formed with the extension of the waveguide for unnecessary light 3 on the side that is closer to the waveguide for collecting unnecessary light 4 and the waveguide for collecting unnecessary light 4 to the beam center of the waveguide for connection 5 (see FIG. 3(d)).

It is assumed that it is possible to satisfactorily curb refraction if the distance of the outer boundary or the inner boundary of the waveguide for connection 5 from the center of portion connected to the waveguide for collecting unnecessary light 4 is sufficiently far away from a peak interval (X in FIG. 2) of excited higher-order mode light. Therefore, the width of the waveguide for connection 5 may be set such that W4/1.5>D/2 is satisfied in a case in which the mode field diameter at the connected portion between the waveguide for collecting unnecessary light 4 and the waveguide for connection 5 is assumed to be D. Note that in FIG. 2, the example of the waveform pattern of single-mode light is represented by the broken line M1 and the example of the waveform pattern of higher-order mode light is represented by the solid line M2.

Figure 4B:
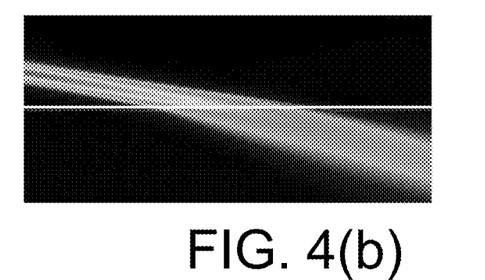
Figure 4C:
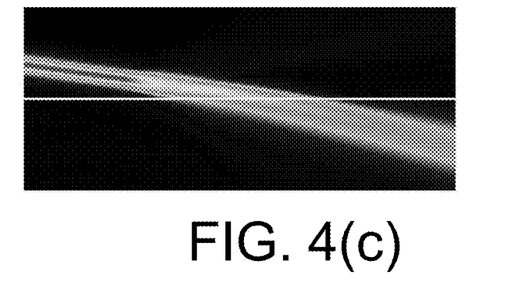

FIG. 4(a) to FIG. 4(c) are diagrams illustrating a state in which the unnecessary light introduced to the waveguide for collecting unnecessary light is refracted. FIG. 4(a) illustrates a state of refraction of the unnecessary light in the configuration in the related art illustrated in FIG. 1, FIG. 4(b) illustrates a state of refraction of the unnecessary light in the configuration illustrated in FIG. 3(a), and FIG. 4(c) illustrates a state of refraction of the unnecessary light in the configuration example illustrated in FIG. 3(d). As is obvious from these drawings, it is possible to curb the entry angle of the unnecessary light introduced to the waveguide for collecting unnecessary light in the configuration according to the disclosure as compared with that in the related art.

Figure 5B:
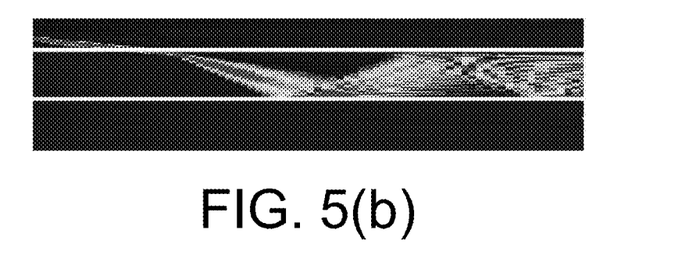

FIG. 5(a) to FIG. 5(b) are diagrams illustrating a state in which the unnecessary light that has been introduced to the waveguide for collecting unnecessary light propagates. FIG. 5(a) illustrates a state of refraction of the unnecessary light in a configuration in the related art, and FIG. 5(b) illustrates a state of refraction of the unnecessary light in the configuration according to the embodiment. Note that the waveguide for collecting unnecessary light has substantially equal widths before and after the portion connected to the waveguide for connection. The unnecessary light is significantly refracted when the unnecessary light is incident on the waveguide for collecting unnecessary light, and a part of the unnecessary light leaks from the waveguide for collecting unnecessary light in the configuration in the related art, however, the refraction of the unnecessary light is alleviated and the leakage of the unnecessary light is eliminated by employing the configuration according to the disclosure. According to the disclosure, it is possible to prevent the unnecessary light from leaking out without changing the width of the waveguide for collecting unnecessary light in this manner.

FIG. 6(a) to FIG. 6(b) are diagrams illustrating examples of a configuration in which a plurality of waveguides for unnecessary light are connected to the waveguide for collecting unnecessary light. FIG. 6(a) illustrates a configuration in which the plurality of waveguides 3 for unnecessary light are disposed on one side of the waveguide for collecting unnecessary light 4 and are connected to the waveguide for collecting unnecessary light 4 via the waveguides for connection 5 that are discretely connected thereto. It is possible to efficiently collect the unnecessary light by connecting the plurality of waveguides for unnecessary light to the same waveguide for collecting unnecessary light in this manner.

In addition, FIG. 6(b) illustrates a configuration in which the waveguides for unnecessary light 3 are disposed on one side and the other side of the waveguide for collecting unnecessary light 4 and are connected to the waveguide for collecting unnecessary light 4 via the waveguides for connection 5 that are discretely connected thereto. Therefore, it is possible to collect the unnecessary light from both sides of the waveguide for collecting unnecessary light, thereby to reduce the number of waveguides for collecting unnecessary light, and to shorten the width of the optical waveguide element.

FIG. 7 is a diagram illustrating an example of a disposition of the waveguide for collecting unnecessary light. In FIG. 7, the waveguide for collecting unnecessary light 4 is disposed between (inside) the two waveguides after branching after the respective branching sections in the first and second stages in the main waveguide 2. With such a configuration, it is possible to efficiently collect the unnecessary light with a smaller number of waveguides for collecting unnecessary light. Note that FIG. 7 illustrates only representative ones among multiple waveguides for unnecessary light and waveguides for collecting unnecessary light.

FIG. 8 is a diagram illustrating another example of the disposition of the waveguide for collecting unnecessary light. In FIG. 8, a main optical waveguide 2A to which a first light wave is input and a main waveguide 2B to which a second light wave is input are formed in one substrate 1 such that the main optical waveguide 2A and the main waveguide 2B each independently perform optical modulation. Also, the waveguide for collecting unnecessary light 4 is disposed between the main optical waveguide 2A and the main waveguide 2B. With such a configuration, it is possible to prevent crosstalk of the light waves between the main optical waveguide 2A and the main waveguide 2B. Note that FIG. 8 illustrates only representative ones among multiple waveguides for unnecessary light and waveguides for collecting unnecessary light.

Although the disclosure has been described above on the basis of embodiments, the disclosure is not limited to the aforementioned details, and design modifications can appropriately be made without departing from the gist of the disclosure.

According to the disclosure, it is possible to provide an optical waveguide element that curbs refraction when the unnecessary light emitted from the waveguide for unnecessary light is introduced to the waveguide for collecting unnecessary light and prevent deterioration of optical properties and the like.

In order to solve the aforementioned problems, an optical waveguide element according to the disclosure has the following technical features.

(1) According to an embodiment, there is provided an optical waveguide element in which an optical waveguide is formed on a substrate, the optical waveguide has a main waveguide that propagates signal light, a waveguide for unnecessary light that guides unnecessary light released from the main waveguide, and a waveguide for collecting unnecessary light to which the unnecessary light emitted from the waveguide for unnecessary light is introduced, the waveguide for unnecessary light is connected to the waveguide for collecting unnecessary light via a waveguide for connection, and a width of the waveguide for connection, which is a width in a direction that perpendicularly intersects a propagation direction of the unnecessary light, at a portion connected to the waveguide for collecting unnecessary light is set to be wider than a width at a portion of the waveguide for unnecessary light connected to the waveguide for connection.

(2) In the optical waveguide element according to (1), the waveguide for collecting unnecessary light has substantially equal widths before and after a portion at which the waveguide for collecting unnecessary light is connected to the waveguide for connection.

(3) In the optical waveguide element according to (1) or (2), a distance from a connection point between a boundary of the waveguide for connection on a side that is closer to the waveguide for collecting unnecessary light and the waveguide for collecting unnecessary light to a center line of the waveguide for connection is longer than a distance from a connection point between a boundary of a shape formed with an extension of the waveguide for unnecessary light on a side that is closer to the waveguide for collecting unnecessary light and the waveguide for collecting unnecessary light to the center line of the waveguide for connection in a plan view of the substrate.

(4) In the optical waveguide element according to any one of (1) to (3), a plurality of waveguides for unnecessary light are connected to the same waveguide for collecting unnecessary light via waveguides for connection that are discretely connected to the respective waveguides for unnecessary light.

(5) In the optical waveguide element according to (4), the plurality of waveguides for unnecessary light include a waveguide for unnecessary light that is disposed on one side of the same waveguide for collecting unnecessary light and a waveguide for unnecessary light that is disposed on the other side.

According to the disclosure, since the waveguide for unnecessary light is connected to the waveguide for collecting unnecessary light via the waveguide for connection, and the width of the waveguide for connection at the portion connected to the waveguide for collecting unnecessary light is set to be wider than the width at the portion of the waveguide for unnecessary light connected to the waveguide for connection, refraction when the unnecessary light is introduced to the waveguide for collecting unnecessary light is curbed. In this manner, it is possible to provide an optical waveguide element that is capable of preventing a part of the unnecessary light leaks from the waveguide for collecting unnecessary light and coupling to the other part of the optical waveguide and that prevents deterioration of optical properties and the like.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical waveguide element in which an optical waveguide is formed on a substrate, the optical waveguide has a main waveguide that propagates signal light, a waveguide for unnecessary light that guides unnecessary light released from the main waveguide, and a waveguide for collecting unnecessary light to which the unnecessary light emitted from the waveguide for unnecessary light is introduced, wherein the waveguide for unnecessary light is connected to the waveguide for collecting unnecessary light via a waveguide for connection, and a width of the waveguide for connection, which is a width in a direction that perpendicularly intersects a propagation direction of the unnecessary light, at a portion connected to the waveguide for collecting unnecessary light is set to be wider than a width at a portion connected to the waveguide for unnecessary light with the waveguide for connection, wherein a distance from a connection point between a boundary of the waveguide for connection on a side that is closer to the waveguide for collecting unnecessary light and the waveguide for collecting unnecessary light to a center line of the waveguide for connection is longer than a distance from a connection point between a boundary of a shape formed with an extension of the waveguide for unnecessary light on a side that is closer to the waveguide for collecting unnecessary light and the waveguide for collecting unnecessary light to the center line of the waveguide for connection in a plan view of the substrate.

2. The optical waveguide element according to claim 1, wherein the waveguide for collecting unnecessary light has substantially equal widths before and after a portion at which the waveguide for collecting unnecessary light is connected to the waveguide for connection.

3. The optical waveguide element according to claim 1, wherein a plurality of waveguides for unnecessary light are connected to the same waveguide for collecting unnecessary light via waveguides for connection that are discretely connected to the respective waveguides for unnecessary light.

4. The optical waveguide element according to claim 3, wherein the plurality of waveguides for unnecessary light comprise a waveguide for unnecessary light that is disposed on one side of the same waveguide for collecting unnecessary light and a waveguide for unnecessary light that is disposed on the other side.

* * * * *